United States Patent [19]

Vosper

[11] 4,338,004
[45] Jul. 6, 1982

[54] SNAP-IN LENS FOR GLASSES

[76] Inventor: George W. Vosper, 149 Earl St., Kingston, Ontario, Canada, K7L 2H3

[21] Appl. No.: 92,742

[22] Filed: Nov. 9, 1979

[51] Int. Cl.³ .......................... G02C 9/00; G02C 7/08; G02C 1/00
[52] U.S. Cl. ........................................ 351/47; 351/57; 351/86
[58] Field of Search ..................... 351/47, 57, 86, 106, 351/92

[56] References Cited

U.S. PATENT DOCUMENTS 215,624 2/1922 Leonard.
3,890,037 6/1975 Zingarelli .............................. 351/47

FOREIGN PATENT DOCUMENTS 2717967 12/1977 Fed. Rep. of Germany ........ 351/86
5819 of 1912 United Kingdom .................. 351/86

Primary Examiner—John K. Corbin
Assistant Examiner—Rodney B. Bovernick
Attorney, Agent, or Firm—Stanley E. Johnson; Richard J. Hicks

[57] ABSTRACT

Spectacle frames having a groove in the nose pads remote from the nose contacting surface portion thereof and grooves in the frame adjacent respective ones of the hinge connections of the legs to the frame for receiving respective ones of a pair of resiliently flexible, colored transparent plates behind the normal lenses of the spectacles.

1 Claim, 3 Drawing Figures

SNAP-IN LENS FOR GLASSES

This invention relates to improvements in spectacle frames, and more particularly modifications thereto permitting readily detaching and snapping in a coloured, transparent, resiliently flexible plate.

The principal object of the present invention is to provide a relatively inexpensive means of providing ordinary eye glasses with a removable coloured lens to protect ones eyes from the rays of the sun and at the same time, mounted on the frame in such a manner that they are undetectable by others.

In Canadian Pat. No. 215,624 issued Feb. 7th, 1922 there is disclosed coloured celluloid plates having a plurality of lugs bent so as to form a hook and adapted to engage the rim of the eye glass frame. The lugs are readily observable by others and thus clearly show as an attachment when worn. The lugs are also subject to breaking and, from an appearance point of view, necessitates shaping the celluloid plate precisely to the outline shape of the eye glass frame. Frames today, however, come in many different styles, shapes and sizes.

In overcoming the deficiencies of the prior art, applicant has devised a minor modification to the spectacle frame, permitting snapping in a resiliently flexible, coloured plate between the existing lens and the wearer's eye. This hides them from the view of others and thus are undetectable by others. Also, as they are behind the lens; i.e. rear face of the lens frame, the outline configuration of the plate need not conform to that of the spectacle frame.

In accordance with the present invention the spectacle frame is grooved at two spaced apart positions behind the lens, one groove being adjacent the hinge and the other in the nose piece pad. This provides a two point contact for snapping in therebetween a coloured, resiliently flexible, transparent plate. The plate is notched at the respective positions where it projects into the two grooves and this locates the flexible plate on the frame preventing accidental displacement therefrom in an upward or downward direction.

The invention is illustrated by way of example in the accompanying drawings wherein.

Figure 1:
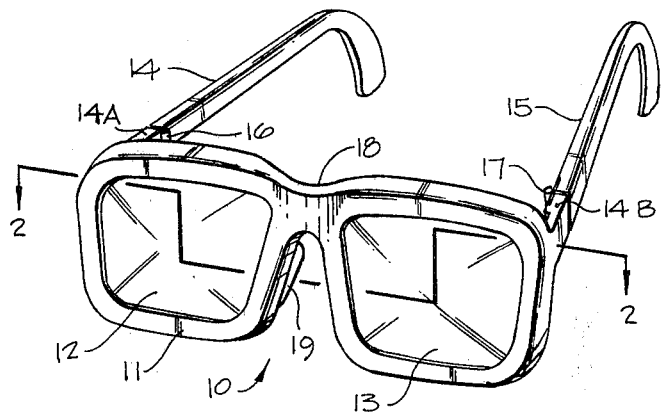
FIG. 1 is an oblique view of commonly used eye glasses and having the frame thereof modified in accordance with the present invention.
Figure 2:
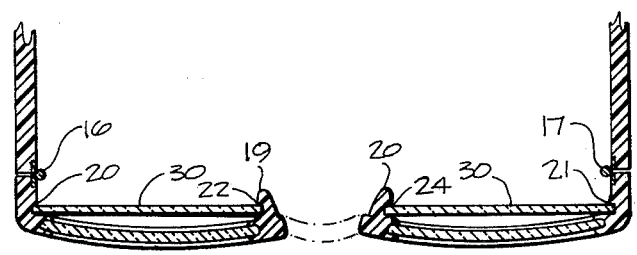
FIG. 2 is a stepped section taken along line 2—2 of FIG. 1.

Referring now to the drawings, there is illustrated spectacles 10 comprising a frame 11 having respective lenses 12 and 13 fitting in suitable channels in the frame. The frame has respective legs 14 and 15 pivotally attached to respective stub legs 14A and 14B in a conventional manner by hinges 16 and 17. The frame has a conventional bridge 18, below which there is a nose fitting portion having on opposite sides thereof rearwardly curved nose pads 19 and 20 normally formed integral with the frame.

Figure 3:
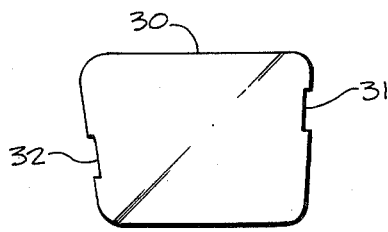
FIG. 3 is a front elevational view of one of the flexible, coloured snap-in plates.

In accordance with the present invention the back face of the nose pads, i.e. the face opposite the one which normally bears against the wearer's nose, are grooved as indicated at 22 and 24 respectively and further grooves at 20 and 21 are located in the frame forwardly of hinges 16 and 17. A resiliently flexible, transparent coloured plate 30, i.e., celluloid or any common plastics material, snap fits into the grooves 20 and 22 and similarly, a second, transparent, coloured plate 30 snap fits into opposing grooves 21 and 24. The coloured plate as seen from FIG. 3, has notches 31 and 32 corresponding in one instance to the grooves 20 and 22. In the other instance notches 31 and 32 correspond to or cooperate with grooves 21 and 24. The notch 32 has a length corresponding substantially to the length of the grooved portion of the nose pad and, similarly notch 31 has a length corresponding to the length of the groove in the stub leg of the frame. Notches 31 and 32 of one coloured plate thus receive respectively the frame grooved at 20 and the nose pad grooved at 22 locking the detachable plate in position. Similarly, notches 31 and 32 of the other plate snap into grooves 21 and 24 respectively.

Figure 4:
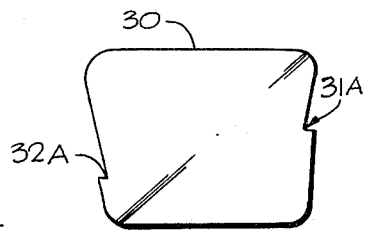
FIG. 4 is similar to FIG. 3 but illustrating a modification thereto.

A modified form of the notches 31 and 32 is illustrated in FIG. 4. In this embodiment each notch provides only one ledge, the two ledges being designated respectively 31A and 32A. These ledges engage the spectacle frame adjacent the lower edge of the respective grooves in the frame and prevent upward displacement of the coloured plate. Downward displacement is preventing by a wedging action resulting from the inwardly and downwardly sloping side edges of the plate.

By virtue of having the detachable plate located behind the normal lens it can be of relatively soft and/or thin material. Also, by virtue of such position they provide eye protection in case of breakage of the main lenses in the glasses. Furthermore, the outline configuration need not be exactly the same as the frame since the frame hides them from the view of others. This allows having one size of a pair of plates fit various different sizes and shapes of frames. For standardization in the manufacturing of frames to accommodate the plates, consideration need only be given to the spacing between two facing grooves; i.e., 20 and 22 and 21 and 24. The flexible plates are easily removed using ones fingers to do so and when removed they can be carried in ones pocket or purse occupying substantially less space than a second pair of glasses. As the plates are flexible they are not susceptible to damage while being carried.

I claim:

1. In spectacle frames having a nose piece with nose pads on each side thereof that curve rearwardly from the frame, means for mounting a pair of lenses in the frame and a pair of legs each hingedly connected to a stub leg that projects rearwardly from the frame portion that receives the lenses, the improvement comprising a groove in the rearwardly curved nose pads on the side thereof remote from the nose contacting surface and a groove in respective ones of the pair of stub legs, the respective grooves in the nose pads facing respective ones of the grooves in the stub legs for detachably snap fittingly receiving therein respective ones of a pair of resiliently, flexible, coloured transparent plates at a position behind the lens receiving portion of the frame whereby the plates are hidden from the view of other by the frame, a pair of resilient flexible coloured transparent plates, each said plate having a pair of notches in the peripheral edge thereof, one such notch receiving the stub leg portion of the frame and the other providing a ledge bearing against the nose piece preventing upward displacement of the flexible plate relative to the spectacle frame when mounted thereon.

* * * * *